United States Patent
Fukutome et al.

(10) Patent No.: US 12,540,438 B2
(45) Date of Patent: Feb. 3, 2026

(54) LAMINATED ARTICLE AND MOLDED ARTICLE

(71) Applicant: KANEKA CORPORATION, Osaka (JP)

(72) Inventors: Asuka Fukutome, Settsu (JP); Yasunori Okada, Settsu (JP); Tetsuo Okura, Settsu (JP); Kensuke Murashima, Settsu (JP)

(73) Assignee: KANEKA CORPORATION, Osaka (JP)

( * ) Notice: Subject to any disclaimer, the term of this patent is extended or adjusted under 35 U.S.C. 154(b) by 294 days.

(21) Appl. No.: 18/245,596

(22) PCT Filed: Sep. 9, 2021

(86) PCT No.: PCT/JP2021/033162
§ 371 (c)(1),
(2) Date: Mar. 16, 2023

(87) PCT Pub. No.: WO2022/059592
PCT Pub. Date: Mar. 24, 2022

(65) Prior Publication Data
US 2023/0332356 A1 Oct. 19, 2023

(30) Foreign Application Priority Data
Sep. 17, 2020 (JP) .................................. 2020-156003

(51) Int. Cl.
*D21H 19/12* (2006.01)
*D21H 25/06* (2006.01)

(52) U.S. Cl.
CPC ............. *D21H 19/12* (2013.01); *D21H 25/06* (2013.01)

(58) Field of Classification Search
None
See application file for complete search history.

(56) References Cited

U.S. PATENT DOCUMENTS

| 6,033,747 A | 3/2000 | Shiotani |
| 2003/0113564 A1 | 6/2003 | Noda et al. |

(Continued)

FOREIGN PATENT DOCUMENTS

| JP | 10-128920 A | 5/1998 |
| JP | 2013-185139 A | 9/2013 |

(Continued)

OTHER PUBLICATIONS

International Search Report mailed on Oct. 19, 2021 in PCT/JP2021/033162 filed on Sep. 9, 2021 (3 pages).

*Primary Examiner* — Chinessa T. Golden
(74) *Attorney, Agent, or Firm* — Oblon, McClelland, Maier & Neustadt, L.L.P.

(57) ABSTRACT

A laminated article includes a base layer and a coating layer disposed over at least one side of the base layer. The coating layer contains a poly(3-hydroxybutyrate) resin. In a crystalline melting curve obtained by differential scanning calorimetry of the coating layer, the coating layer has at least one peak top temperature (Tma) in the range of 100 to 150° C. and at least one peak top temperature (Tmb) in the range of 150 to 170° C., and the difference between the temperatures Tma and Tmb is 10° C. or more.

16 Claims, 1 Drawing Sheet

(56) References Cited

U.S. PATENT DOCUMENTS

| | | | | |
|---|---|---|---|---|
| 2006/0258833 A1* | 11/2006 | Senda | ................ | C08L 67/04 528/272 |
| 2010/0305280 A1* | 12/2010 | Whitehouse | ............ | C08L 67/04 525/450 |
| 2015/0203674 A1* | 7/2015 | Weinlein | ................ | C08L 27/06 524/109 |
| 2017/0260416 A1 | 9/2017 | Joyce et al. | | |

FOREIGN PATENT DOCUMENTS

| | | |
|---|---|---|
| WO | WO 2004/041936 A1 | 5/2004 |
| WO | WO 2019/239913 A1 | 12/2019 |

\* cited by examiner

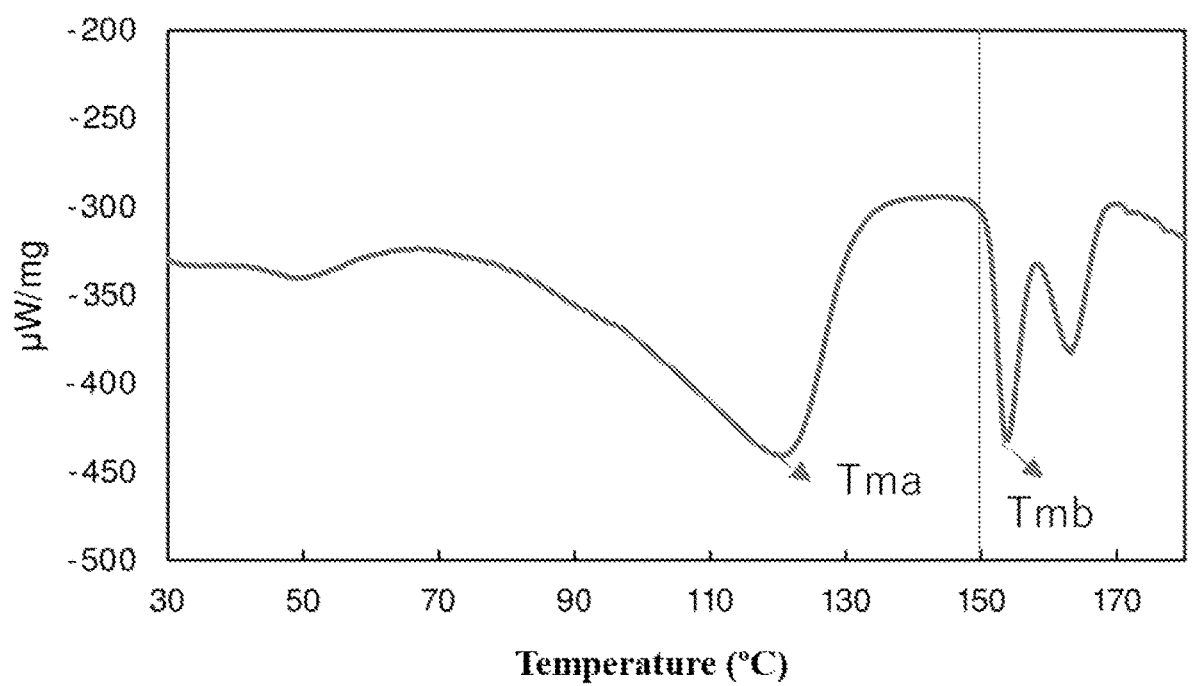

LAMINATED ARTICLE AND MOLDED ARTICLE

CROSS-REFERENCE TO RELATED APPLICATIONS

The present application is a 35 U.S.C. § 371 national stage patent application of International patent application PCT/JP2021/033162, filed on Sep. 9, 2021, which is based on and claims the benefits of priority to Japanese Application No. 2020-156003, filed on Sep. 17, 2020. The entire contents of all of the above applications are incorporated herein by reference.

TECHNICAL FIELD

The present invention relates to a laminated article including a coating layer containing a poly(3-hydroxybutyrate) resin and a molded article including the laminated article.

BACKGROUND ART

In recent years, environmental problems due to waste plastics have become an issue of great concern. In particular, waste plastics have caused serious marine pollution, and there is a demand for widespread use of biodegradable plastics which are degradable in the natural environment. Various kinds of such biodegradable plastics are known. Poly(3-hydroxyalkanoate) resins are thermoplastic polyesters produced and accumulated as energy storage substances in cells of many kinds of microorganisms, and these resins are biodegradable in seawater as well as in soil and thus are attracting attention as materials that can be a solution to the above-mentioned problems.

A laminated article including a biodegradable base such as paper and a poly(3-hydroxybutyrate) resin-containing layer disposed on the base is very promising in terms of environmental protection because both the resin and the base have high biodegradability (see Patent Literature 1, for example).

CITATION LIST

Patent Literature

PTL 1: WO 2019/239913

SUMMARY OF INVENTION

Technical Problem

In the case of a conventionally-reported laminated article including a base and a poly(3-hydroxybutyrate) resin-containing layer disposed on the base, the heating temperature usable in bonding by heat sealing of the resin layer during a molding process is limited to a narrow range. In particular, if the heat sealing is performed at a high temperature, a relatively long time needs to pass after the heat sealing in order that satisfactory bond strength may be exhibited, and this leads to low production efficiency.

In view of the above circumstances, the present invention aims to provide a laminated article including a poly(3-hydroxybutyrate) resin-containing layer, the laminated article being designed such that the resin layer can be bonded by heat sealing during a molding process of the laminated article, that the range of the usable heat sealing temperature is wide, and that satisfactory bond strength can be exhibited in a short time after heating even when the resin is heated to a temperature high enough to ensure the bonding of the resin layer.

Solution to Problem

As a result of intensive studies with the goal of solving the above problem, the present inventors have found that the problem can be solved when a coating layer containing a poly(3-hydroxybutyrate) resin is adapted to exhibit given peaks in a crystalline melting curve obtained by differential scanning calorimetry. Based on this finding, the inventors have completed the present invention.

Specifically, the present invention relates to a laminated article including: a base layer; and a coating layer disposed over at least one side of the base layer, wherein the coating layer contains a poly(3-hydroxybutyrate) resin, in a crystalline melting curve obtained by differential scanning calorimetry of the coating layer, the coating layer has at least one peak top temperature (Tma) in a range of 100 to 150° C. and at least one peak top temperature (Tmb) in a range of 150 to 170° C., and a difference between the temperatures Tma and Tmb is 10° C. or more.

Preferably, in the crystalline melting curve obtained by the differential scanning calorimetry of the coating layer, a ratio (AHb/AHa) of a crystalline melting enthalpy (AHb) of the peak in the range of 150 to 170° C. to a crystalline melting enthalpy (AHa) of the peak in the range of 100 to 150° C. is from 0.01 to 2.

Preferably, the poly(3-hydroxybutyrate) resin has a weight-average molecular weight of $5 \times 10^4$ to $65 \times 10^4$.

Preferably, the poly(3-hydroxybutyrate) resin includes at least one type of poly(3-hydroxybutyrate-co-3-hydroxyhexanoate).

Preferably, the poly(3-hydroxybutyrate) resin includes at least two types of poly(3-hydroxybutyrate-co-3-hydroxyhexanoate) differing in contents of constituent monomers.

Preferably, the poly(3-hydroxybutyrate) resin includes poly(3-hydroxybutyrate-co-3-hydroxyhexanoate) having a 3-hydroxyhexanoate unit content of 8 to 25 mol %. More preferably, the poly(3-hydroxybutyrate) resin further includes poly(3-hydroxybutyrate-co-3-hydroxyhexanoate) having a 3-hydroxyhexanoate unit content of less than 8 mol % or poly(3-hydroxybutyrate).

The present invention further relates to a method for producing the laminated article as defined above, the method including: applying an aqueous coating liquid containing the poly(3-hydroxybutyrate) resin to a base to form a film of the aqueous coating liquid; and heating the film at a temperature of 130 to 170° C. to form the coating layer.

The present invention further relates to a molded article including the laminated article as defined above.

The present invention further relates to a method for producing the molded article as defined above, the method including heat-sealing the coating layer.

Advantageous Effects of Invention

The present invention can provide a laminated article including a poly(3-hydroxybutyrate) resin-containing layer, the laminated article being designed such that the resin layer can be bonded by heat sealing during a molding process of the laminated article, that the range of the usable heat sealing temperature is wide, and that satisfactory bond strength can be exhibited in a short time after heating even when the resin is heated to a temperature high enough to ensure the bonding of the resin layer. With the use of the laminated article of the present invention, the cycle time of the heat sealing can be shortened to improve the efficiency of production of a molded article.

BRIEF DESCRIPTION OF DRAWINGS

FIG. 1 shows a crystalline melting curve obtained by differential scanning calorimetry for Example 1.

DESCRIPTION OF EMBODIMENTS

Hereinafter, embodiments of the present invention will be described. The present invention is not limited to the embodiments described below.

[Laminated Article]

A laminated article according to one embodiment of the present invention includes a base layer and a coating layer disposed over at least one side of the base layer, and the coating layer contains a poly(3-hydroxybutyrate) resin.

The coating layer may be disposed over only one side of the base layer or over both sides of the base layer. The coating layer may be disposed over the base layer with another layer interposed between the coating layer and the base layer or may be disposed directly on the base layer without any other layer interposed between the coating layer and the base layer. Another layer may be disposed on the coating layer.

(Base Layer)

The base layer is not limited to a particular type and may be any layer over which the coating layer can be disposed. The base layer is preferably a biodegradable layer. When the base layer is a biodegradable layer, the whole laminated article including the coating layer is biodegradable. Such a laminated article is more beneficial as a material for solving the problem of marine pollution.

The base layer is preferably absorbent in terms of preventing the coating liquid from running on the surface of the base layer and forming a film with non-uniform thickness.

Examples of biodegradable base layers include, but are not limited to, a layer of paper (whose main component is cellulose), a layer of cellophane, a layer of cellulose ester, a layer of polyvinyl alcohol, a layer of polyamino acid, a layer of polyglycolic acid, a layer of pullulan, and any of these layers on which an inorganic substance such as aluminum or silica is vapor-deposited. A layer of paper is preferred because it has high heat resistance and is inexpensive. The paper is not limited to a particular type, and examples of the paper include cup paper, kraft paper, high-quality paper, coated paper, tissue paper, glassine paper, and paperboard. The type of the paper can be selected as appropriate depending on the intended use of the laminated article. Additives such as a water-resisting agent, a water repellent, and an inorganic substance may be added to the paper as necessary. The paper may be surface-treated to have an oxygen barrier coating or a water vapor barrier coating.

The base layer may be subjected to a surface treatment such as corona treatment, flame treatment, or anchor coat treatment. One of such surface treatments may be performed alone, or two or more surface treatments may be used in combination.

The coating layer can be formed, as described below, by applying an aqueous coating liquid to one or both sides of the base layer and heating a film of the applied coating liquid to dry the film into a solid layer. When the coating layer is formed directly on the base layer without any other layer interposed between the coating layer and the base layer, part of the aqueous coating liquid seeps into the base layer in the course of production of the laminated article, with the result that an intermediate layer containing part of the poly(3-hydroxybutyrate) resin derived from the coating layer and part of the material derived from the base layer can be formed between the coating layer and the base layer. Such an intermediate layer cannot be found in any laminated article produced by an extrusion molding process such as extrusion lamination and is characteristic of a laminated article including the coating layer. The form of the intermediate layer of the resulting laminated article can be easily observed by means such as a scanning electron microscope (SEM).

(Coating Layer)

The coating layer contains at least a poly(3-hydroxybutyrate) resin. In the present specification, the poly(3-hydroxybutyrate) resin (also referred to as "P3HB resin" hereinafter) is an aliphatic polyester resin producible by microorganisms and containing 3-hydroxybutyrate as repeating units.

The P3HB resin may be poly(3-hydroxybutyrate) which contains only 3-hydroxybutyrate as repeating units or may be a copolymer of 3-hydroxybutyrate and another hydroxyalkanoate.

The P3HB resin may be a mixture of a homopolymer and one or more copolymers or a mixture of two or more copolymers. The copolymerization is not limited to a particular type and may be random copolymerization, alternating copolymerization, block copolymerization, or graft copolymerization.

Examples of the P3HB resin include poly(3-hydroxybutyrate) (P3HB), poly(3-hydroxybutyrate-co-3-hydroxyhexanoate) (P3HB3HH), poly(3-hydroxybutyrate-co-3-hydroxyvalerate) (P3HB3HV), poly(3-hydroxybutyrate-co-4-hydroxybutyrate) (P3HB4HB), poly(3-hydroxybutyrate-co-3-hydroxyoctanoate) (P3HB3HO), poly(3-hydroxybutyrate-co-3-hydroxyoctadecanoate) (P3HB3HOD), poly(3-hydroxybutyrate-co-3-hydroxydecanoate) (P3HB3HD), and poly(3-hydroxybutyrate-co-3-hydroxyvalerate-co-3-hydroxyhexanoate) (P3HB3HV3HH). Among these, P3HB, P3HB3HH, P3HB3HV, and P3HB4HB are preferred since they are easy to industrially produce.

P3HB3HH, which is a copolymer of 3-hydroxybutyrate and 3-hydroxyhexanoate, is more preferred for the following reasons: the ratio between the repeating units can be varied to change the melting point and crystallinity and thus adjust the physical properties such as the Young's modulus and heat resistance to levels intermediate between those of polypropylene and polyethylene; and this plastic is easy to industrially produce as mentioned above and useful in terms of physical properties. P3HB3HH is preferred also in that it can have a low melting point and be moldable at low temperature.

In one embodiment of the present invention, the P3HB resin preferably includes at least one type of P3HB3HH and particularly preferably includes at least two types of poly(3-hydroxybutyrate-co-3-hydroxyhexanoate) differing in the contents of the constituting monomers. It is also preferable for the P3HB resin to include at least one type of P3HB3HH and P3HB.

The microorganism used to produce the P3HB resin is not limited to particular species and may be any microorganism that has the ability to produce the P3HB resin. The first example of P3HB-producing bacteria is *Bacillus megaterium* discovered in 1925, and other examples include naturally occurring microorganisms such as *Cupriavidus* necator (formerly classified as *Alcaligenes eutrophus* or *Ralstonia*

*eutropha*) and *Alcaligenes latus*. These microorganisms are known to accumulate P3HB in their cells.

Known examples of bacteria that produce copolymers of 3-hydroxybutyrate with other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038; see T. Fukui, Y Doi, *J Bacteriol.*, 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable P3HB resin synthesis-related gene introduced may be used depending on the P3HB resin to be produced. The culture conditions including the type of the substrate may be optimized depending on the P3HB resin to be produced.

P3HB3HH can be produced, for example, by a method described in WO 2010/013483. An example of commercially-available P3HB3HH is "Kaneka Biodegradable Polymer PHBH™" of Kaneka Corporation.

The P3HB resin preferably includes P3HB3HH having a 3HH unit content of 8 to 25 mol %. The content ratio between the constituting monomers in the P3HB3HH, i.e., the 3HB/3HH ratio, is preferably from 92 to 75/8 to 25 (mol %/mol %) and more preferably from 90 to 82/10 to 18 (mol %/mol %). When the 3HH unit content of the P3HB3HH is 8 mol % or more, the coating layer having melting characteristics described below can be easily formed. The P3HB3HH having a 3HH unit content of 25 mol % or less is relatively easy to produce since the rate of crystallization is not excessively slow. The content ratio between the constituent monomers is determined through NMR spectroscopy of the P3HB3HH.

The P3HB3HH having a 3HH unit content of 8 to 25 mol % may be used alone as the P3HB resin or may be used in combination with P3HB3HH having a 3HH unit content of less than 8 mol % or with P3HB (homopolymer of 3HB). With the combined use, the ratio ΔHb/ΔHa described below can be greater than with the use of the P3HB3HH having a 3HH unit content of 8 to 25 mol % alone. Additionally, satisfactory bond strength can be exhibited in a short time after heat sealing even when the heat sealing temperature is raised to a temperature high enough to ensure bonding of the coating layer.

In the P3HB3HH having a 3HH unit content of less than 8 mol %, the 3HH unit content is preferably 5 mol % or less, more preferably 3 mol % or less, and even more preferably 1 mol % or less. The lower limit of the 3HH unit content of this P3HB3HH is not limited to a particular value, and the 3HH unit content may be, for example, 0.1 mol % or more.

The amount of the P3HB3HH having a 3HH unit content of less than 8 mol % or the amount of P3HB is not limited to a particular range, but is preferably from 0 to 50 wt % of the total amount of the P3HB resin contained in the coating layer. When the P3HB3HH or P3HB is added, the amount of the P3HB3HH or P3HB is preferably from 1 to 50 wt %, more preferably from 3 to 30 wt %, even more preferably from 4 to 20 wt %, and particularly preferably from 5 to 15 wt %.

Microbially produced P3HB3HH is a random copolymer. The adjustment of the 3HH unit content can be accomplished by selection of a suitable bacterium, by selection of a suitable carbon source as a raw material, by addition of P3HB3HH having a different 3HH unit content, or by addition of a homopolymer of 3HB.

According to one embodiment of the present invention, the weight-average molecular weight of the P3HB resin is preferably from $5\times10^4$ to $65\times10^4$, more preferably from $10\times10^4$ to $60\times10^4$, even more preferably from $15\times10^4$ to $55\times10^4$, and particularly preferably from $15\times10^4$ to $50\times10^4$. When the weight-average molecular weight of the P3HB resin is in the above range, the coating layer can exhibit high bond strength as a result of heat sealing. The weight-average molecular weight of the P3HB resin can be determined as a polystyrene-equivalent molecular weight measured by gel permeation chromatography (GPC; "Shodex GPC-101" manufactured by Showa Denko K.K.) using a polystyrene gel ("Shodex K-804" manufactured by Showa Denko K. K) as the column and chloroform as the mobile phase.

The coating layer may contain one or more resins other than the P3HB resin so long as the effect of the invention is achieved. Examples of the other resins include: aliphatic polyester resins such as polybutylene succinate, polycaprolactone, and polylactic acid; and aliphatic-aromatic polyester resins such as polybutylene adipate terephthalate, polybutylene sebacate terephthalate, and polybutylene azelate terephthalate. The amount of these resins is preferably 10 parts by weight or less per 100 parts by weight of the P3HB resin in order to ensure the biodegradability of the coating layer. The coating layer need not contain any resin other than the P3HB resin.

The coating layer may contain additives commonly used in the technical field so long as the effect of the invention is achieved. Examples of the additives include: inorganic fillers such as talc, calcium carbonate, mica, silica, titanium oxide, and alumina; organic fillers such as chaff, wood powder, waste paper (e.g., newspaper), various kinds of starch, and cellulose; colorants such as pigments and dyes; odor absorbers such as activated carbon and zeolite; flavors such as vanillin and dextrin; and various other additives such as plasticizers, oxidation inhibitors, antioxidants, weathering resistance improvers, ultraviolet absorbers, nucleating agents, lubricants, mold releases, water repellents, antimicrobials, slidability improvers, tackifiers, fillers, and chemicals. The coating layer may contain only one additive or may contain two or more two additives. The amount of the additives can be set by those skilled in the art as appropriate depending on the intended use.

According to one embodiment of the present invention, the coating layer has melting characteristics which are such that in a crystalline melting curve obtained by differential scanning calorimetry, the coating layer has at least one peak top temperature (Tma) in the range of 100 to 150° C. and at least one peak top temperature (Tmb) in the range of 150 to 170° C. and that the difference between the temperatures Tma and Tmb is 10° C. or more. By virtue of such melting characteristics of the coating layer, the coating layer can be bonded by heat sealing during a molding process of the laminated article, the range of the usable heat sealing temperature is wide, and satisfactory bond strength can be exhibited in a short time after heating even when the resin is heated to a temperature high enough to ensure the bonding of the coating layer.

It is inferred that since the coating layer has a melting point peak in the relatively high temperature range of 150 to 170° C., a resin crystal having the Tmb acts as a crystal nucleus, which allows the resin melted during the heat sealing to solidify so quickly that satisfactory bond strength can be exhibited in a short time after the heat sealing even when the resin is heated to a temperature high enough to ensure the bonding of the coating layer.

The difference between the temperatures Tma and Tmb is 10° C. or more, preferably 15° C. or more, more preferably 20° C. or more, and even more preferably 25° C. or more. If the temperature difference is less than 10° C., it could be difficult to offer the advantage that satisfactory bond strength can be exhibited in a short time after heating even when the resin is heated to a temperature high enough to ensure the bonding of the coating layer. The upper limit of the difference between the temperatures Tma and Tmb is not limited to a particular value. In terms of ease of production, the temperature difference is, for example, 60° C. or less and more preferably 50° C. or less.

In the present specification, peak top temperatures in a crystalline melting curve in differential scanning calorimetry are defined as follows. An aluminum pan is charged with 2 to 5 mg of the coating layer separated from the base layer, and the coating layer is subjected to differential scanning calorimetry which uses a differential scanning calorimeter and in which the coating layer is melted under a stream of nitrogen by increasing the temperature from 20 to 190° C. at a rate of 10° C./min. In the crystalline melting curve obtained by the calorimetry, the temperature at which is located the top of a melting point peak appearing in the range of 100 to 150° C. is defined as the Tma, and the temperature at which is located the top of a melting point peak appearing in the range of 150 to 170° C. is defined as the Tmb. When there are a plurality of melting point peaks in the range of 100 to 150° C., the temperature at which is located the top of the highest of the melting point peaks is defined as the Tma. When there are a plurality of melting point peaks in the range of 150 to 170° C., the temperature at which is located the top of the highest of the melting point peaks is defined as the Tmb. In FIG. 1, a crystalline melting curve obtained for Example 1 is shown as a typical example of crystalline melting curves with the Tma and Tmb.

In one embodiment of the present invention, it is preferable that, in the crystalline melting curve obtained by differential scanning calorimetry of the coating layer, the ratio ($\Delta Hb/\Delta Ha$) of the crystalline melting enthalpy ($\Delta Hb$) of the peak in the range of 150 to 170° C. to the crystalline melting enthalpy ($\Delta Ha$) of the peak in the range of 100 to 150° C. should be from 0.01 to 2. When the ratio is in this range, the resin melted by heating solidifies so quickly that satisfactory bond strength can be easily exhibited in a short time after heat sealing even when the resin is heated to a temperature high enough to ensure the bonding of the coating layer. The ratio is more preferably from 0.05 to 1, even more preferably from 0.1 to 0.8, still even more preferably from 0.15 to 0.6, and most preferably from 0.2 to 0.4.

When there are a plurality of melting point peaks in the range of 100 to 150° C., the sum of the crystalline melting enthalpies of all of the melting point peaks is defined as $\Delta Ha$. When there are a plurality of melting point peaks in the range of 150 to 170° C., the sum of the crystalline melting enthalpies of all of the melting point peaks is defined as $\Delta Hb$.

The weight of the P3HB resin per unit area (per square meter) of the coating layer is preferably from 5 to 100 g/m$^2$, more preferably from 10 to 50 g/m$^2$, and particularly preferably from 15 to 30 g/m$^2$. When the weight of the P3HB resin per unit area of the coating layer is in this range, the coating layer can be prevented from having defects such as pinholes, can have sufficient strength for practical use, and can effectively exhibit properties such as water resistance.

The weight of the P3HB resin per unit area of the coating layer is measured and evaluated by a method as described in Examples below.

The thickness of the coating layer (when the laminated article includes two or more coating layers as described above, the thickness of each coating layer) is not limited to a particular range but preferably from 5 to 100 μm and more preferably from 10 to 30 μm in terms of preventing water absorption into the base layer and at the same time ensuring sufficient flexibility.

[Method for Producing Laminated Article]

The laminated article according to one embodiment of the present invention can be produced, for example, by applying an aqueous coating liquid to one or both sides of a base layer and heating a film of the applied coating liquid to dry the film into a solid layer. This method is not limited to particular techniques, and any known techniques can be employed.

The method for producing the laminated article may include the following steps of: (a) preparing an aqueous coating liquid; (b) feeding a base layer; (c) applying the aqueous coating liquid to the base layer; and (d) drying a film of the applied aqueous coating liquid into a solid layer.

The step (a) is not limited to a particular technique and may be performed as follows. That is, the step (a) uses a microbially produced P3HB resin and includes disrupting microbial cells containing the P3HB resin in an aqueous dispersion of the microbial cells to separate the P3HB resin from the cells.

A commonly used technique for collecting a P3HB resin from microbial cells is to dissolve the P3HB resin by using an organic solvent such as chloroform and precipitate and collect the P3HB resin by using a solvent such as methanol or hexane in which the P3HB resin is insoluble. However, this technique is economically disadvantageous because the P3HB resin is not obtained in the form of fine particles and there is a need for an additional step of processing the P3HB resin into fine particles. In contrast, the step of disrupting microbial cells containing the P3HB resin in an aqueous dispersion of the microbial cells to separate the P3HB resin from the cells can yield an aqueous dispersion of fine P3HB resin particles which are made of the P3HB resin produced in the microbial cells and a substantial portion of which have a sufficiently small particle size.

In the step of disrupting microbial cells containing the P3HB resin in an aqueous dispersion of the microbial cells to separate the P3HB resin from the cells, it is preferable to perform the disruption and addition of an alkali simultaneously while stirring the microbial cells containing the P3HB resin. This technique offers the following advantages: (i) the dispersion is prevented from having its viscosity increased by cellular components other than the P3HB resin which leak out of the microbial cells; (ii) the prevention of viscosity increase of the cell dispersion allows for pH control, and continuous or intermittent addition of an alkali permits the process to proceed at a low alkali concentration; and (iii) molecular weight reduction of the P3HB resin can be avoided, and the P3HB resin of high purity can be separated. The cell dispersion preferably has a pH of 9 to 13.5 after the alkali addition. When the pH is 9 or higher, the P3HB resin is easy to separate from the cells. When the pH is 13.5 or lower, decomposition of the P3HB resin is likely to be avoided.

The microbial cell disruption may be accomplished using ultrasound or a device such as an emulsifying/dispersing machine, a high-pressure homogenizer, or a mill. Although the means for the microbial cell disruption is not limited to those mentioned below, the use of an emulsifying/dispersing machine such as Silverson Mixer (manufactured by Silverson), Clearmix (manufactured by M Technique Co., Ltd.), or Ebara Milder (manufactured by Ebara Corporation) is preferred in terms of dissolving out the P3HB resin from the cells by the alkali treatment, efficiently disrupting nucleic acids which are a primary cause of viscosity increase, and thoroughly dispersing insoluble substances other than the P3HB resin, such as cell walls, cell membranes, and insoluble proteins. The temperature for the microbial cell disruption and alkali addition is preferably from room temperature to 50° C. The temperature is preferably around room temperature since the P3HB resin is likely to be decomposed if the temperature is higher than 50° C. Decreasing the temperature below room temperature requires a cooling operation and is not economical.

The dispersion resulting from the disruption and alkali treatment of the microbial cells is centrifuged to give a precipitate. The precipitate is rinsed with water and optionally with methanol, and finally a suitable amount of water is added. In this manner, an aqueous coating liquid containing the P3HB resin at a desired solids concentration can be obtained.

The above step is preferably followed by the step of applying mechanical shear to the aqueous coating liquid to separate aggregated particles of the P3HB resin from one another. The application of mechanical shear is preferred in terms of eliminating aggregates substantially and obtaining an aqueous coating liquid containing P3HB resin particles with uniform particle sizes. The application of mechanical shear to the aqueous coating liquid can be accomplished, for example, by means such as a stirrer, a homogenizer, or ultrasound. At this stage, the P3HB resin particles are not so strongly aggregated; thus, the use of a stirrer equipped with a common stirring blade is preferred in terms of simplicity.

The solids concentration of the P3HB resin in the aqueous coating liquid is preferably from 25 to 65 wt %, more preferably from 30 to 55 wt %, and particularly preferably from 35 to 50 wt %. When the solids concentration of the P3HB resin in the aqueous coating liquid is in the above range, coating uniformity can be achieved since the viscosity of the coating liquid is not excessively high. There is also the advantage that a film of the applied coating liquid can have a required thickness and is less likely to suffer from defects.

In terms of ensuring both the P3HB resin productivity and the coating uniformity, the average particle size of the P3HB resin in the aqueous coating liquid is, for example, from 0.1 to 50 µm, preferably from 0.5 to 30 µm, and more preferably from 0.8 to 20 µm. When the average particle size is 0.1 µm or more, the P3HB resin can easily be obtained either by microbial production or by chemical synthesis. When the average particle size is 50 µm or less, uneven application of the aqueous coating liquid can be avoided. The average particle size of the P3HB resin in the aqueous coating liquid can be measured by adjusting an aqueous suspension containing the P3HB resin to a given concentration and subjecting the suspension to analysis using a widely used particle size analyzer such as Microtrac particle size analyzer (FRA manufactured by Nikkiso Co., Ltd.). The average particle size can be determined as a particle size at which the cumulative percentage in a normal distribution curve reaches 50% of all the particles.

The aqueous coating liquid need not contain any emulsifier but preferably contains an emulsifier to stabilize the coating liquid. Examples of the emulsifier include: anionic surfactants such as sodium lauryl sulfate and sodium oleate; cationic surfactants such as lauryl trimethyl ammonium chloride; non-ionic surfactants such as glycerin fatty acid esters and sorbitan fatty acid esters; and water-soluble polymers such as polyvinyl alcohol and polyvinylpyrrolidone. The amount of the emulsifier added is not limited to a particular range but is preferably from 1 to 10 wt % relative to the amount of the solids of the P3HB resin. When the amount of the emulsifier is 1 wt % or more, the stabilizing effect of the emulsifier is likely to be obtained. When the amount of the emulsifier is 10 wt % or less, deterioration in physical properties or coloring due to inclusion of an excess amount of emulsifier in the P3HB resin can be avoided.

The emulsifier can be added to the aqueous dispersion after the water rinsing following the centrifugation subsequent to the disruption and alkali treatment of the microbial cells. When methanol rinsing is carried out, the emulsifier can be added after the methanol rinsing and before or after a suitable amount of water is added to adjust the solids concentration of the P3HB resin.

The steps (b) and (c) are not limited to particular techniques and can be performed using any techniques known in the technical field.

In one embodiment of the present invention, the heating temperature in the step (d) of drying a film of the applied aqueous coating liquid into a solid layer is preferably from 130 to 170° C., more preferably from 135 to 165° C., even more preferably from 138 to 162° C., and particularly preferably from 140 to 160° C. By heating the film of the applied aqueous coating liquid at such a temperature and thus drying the film into a solid layer, the coating layer having the melting characteristics as described above can be formed to obtain the laminated article.

The heating time in the step (d) of drying a film of the applied aqueous coating liquid into a solid layer is not limited to a particular range and can be set as appropriate. The heating time may be, for example, from 30 seconds to 10 minutes and is preferably from 1 to 5 minutes.

The method for producing the laminated article may include the step (e) of winding up the laminated article after the step (d). The step (e) is not limited to a particular technique and can be performed using any technique known in the technical field.

[Molded Article]

A molded article according to one embodiment of the present invention includes the laminated article described above. That is, the molded article includes the laminated article which is designed such that the coating layer can be bonded by heat sealing during secondary processing of the laminated article, that the range of the usable heat sealing temperature is wide, and that satisfactory bond strength can be exhibited in a short time after heating even when the resin is heated to a temperature high enough to ensure the bonding of the coating layer. Thus, the cycle time of the heat sealing can be shortened to improve the efficiency of production of the molded article.

The molded article is not limited to a particular product and may be any product including the laminated article. Examples of the molded article include paper, a film, a sheet, a tube, a plate, a rod, a packaging material (e.g., a bag), a receptacle (e.g., a bottle), and a part. In terms of addressing marine pollution, the molded article is preferably a packaging material or a receptacle.

In one embodiment of the present invention, the molded article may be the laminated article itself. In one embodiment of the present invention, the laminated article included in the molded article may be one subjected to secondary processing.

The molded article including the laminated article subjected to secondary processing is suitable for use as any of various kinds of packaging materials or receptacles such as shopping bags, various other kinds of bags, packaging materials for foods or confectionery products, cups, trays, and cartons. That is, the molded article is suitable for use in various fields such as food industry, cosmetic industry, electronic industry, medical industry, and pharmaceutical industry. Since the laminated article includes the coating layer having high bond strength to the base and having high heat resistance, the laminated article is particularly suitable for use as a receptacle for a hot substance. Examples of such a receptacle include: liquid receptacles such as, in particular, cups for foods or beverages such as instant noodles, instant soups, and coffee; and trays used for prepared foods, boxed lunches, or microwavable foods.

The secondary processing can be performed using any technique known in the technical field. For example, the secondary processing can be performed by means such as a bag-making machine or form-fill-sealing machine. Alternatively, the laminated article may be processed using a device such as a paper cup molding machine, a blanking machine, or a case former. In any of these processing machines, any known technique can be used for the laminated article bonding. Examples of the technique include heat sealing, impulse sealing, ultrasonic sealing, high-frequency sealing, hot air sealing, and flame sealing. In particular, the molded article is preferably obtained through secondary processing using heat sealing; that is, the molded article preferably includes a heat-sealed portion formed by heat sealing of the coating layer. The heat sealing may be carried out between the base layer and the coating layer or between different portions of the coating layer.

The heat sealing temperature at which the laminated article is subjected to heat sealing depends on the bonding technique used or the thicknesses of the base and coating layers. In the case where different portions of the coating layer of the laminated article are heat-sealed together by means of a heat sealing tester equipped with a sealing bar and where the laminated article is heated from both sides in the heat sealing, the heat sealing temperature is typically 250° C. or lower, preferably 240° C. or lower, and more preferably 220° C. or lower. When the heat sealing temperature is in the above range, melting of the resin in the vicinity of the sealed portion can be avoided to ensure a suitable thickness of the coating layer and a suitable seal strength. As to the lower limit of the heat sealing temperature in the case of using a heat sealing tester equipped with a sealing bar, the heat sealing temperature is typically 120° C. or higher and preferably 140° C. or higher. When the heat sealing temperature is in the above range, suitable bonding can be ensured at the sealed portion. The laminated article according to one embodiment of the present invention can exhibit high bond strength in a short time after heat sealing even when the heat sealing temperature is high. Thus, the heat sealing temperature may be 180° C. or higher or may be 200° C. or higher. In a particularly preferred embodiment, the heat sealing temperature may be 220° C. or higher.

In the case where the coating layer of the laminated article is heat-sealed to paper serving as the base of the laminated article by means of a heat sealing tester equipped with a sealing bar and where the laminated article is heated from both sides in the heat sealing, the heat sealing temperature is typically 250° C. or lower, preferably 240° C. or lower, and more preferably 220° C. or lower. When the heat sealing temperature is in the above range, melting of the resin in the vicinity of the sealed portion can be avoided to ensure a suitable thickness of the coating layer and a suitable seal strength. As to the lower limit of the heat sealing temperature in the case of using a heat sealing tester equipped with a sealing bar, the heat sealing temperature is typically 120° C. or higher and preferably 140° C. or higher. When the heat sealing temperature is in the above range, suitable bonding can be ensured at the sealed portion. The laminated article according to one embodiment of the present invention can exhibit high bond strength in a short time after heat sealing even when the heat sealing temperature is high. Thus, the heat sealing temperature may be 170° C. or higher or may be 180° C. or higher. In a particularly preferred embodiment, the heat sealing temperature may be 190° C. or higher.

The heat sealing pressure at which the laminated article is subjected to heat sealing depends on the bonding technique used. In the case of using a heat sealing tester equipped with a sealing bar, the heat sealing pressure is typically 0.1 MPa or more and preferably 0.3 MPa or more. When the heat sealing pressure is in the above range, suitable bonding can be ensured at the sealed portion.

The molded article according to one embodiment of the present invention may, for the purpose of physical property improvement, be combined with another molded article (such as a fiber, a yarn, a rope, a woven fabric, a knit, a non-woven fabric, paper, a film, a sheet, a tube, a plate, a rod, a receptacle, a bag, a part, or a foam) made of a different material than the molded article of the present invention. The material of the other molded article is also preferably biodegradable.

EXAMPLES

Hereinafter, the present invention will be specifically described using examples. The technical scope of the present invention is not limited by the examples given below.

(Peeling Test)

Each sheet of coated paper was cut into a 25-mm-wide piece. A heat sealer (TP-701-B, manufactured by Tester Sangyo Co., Ltd.) was used to pressure-bond together different portions of the coating layer of the piece of coated paper or pressure-bond the coating layer to the paper base of the piece of coated paper. The conditions were as follows: heating temperature=120° C., 140° C., 160° C., 170° C., 180° C., 190° C., 200° C., or 220° C.; specific pressure=0.4 MPa; and sealing time=1 second. Two seconds after the heat sealing bar was moved away from the piece of coated paper, the sealed surface was peeled off with a hand. The peeled surface was visually inspected, and ratings were made according to the following criteria.

<Ratings>

Good: The paper base underwent material failure.

Average: A part of the paper base underwent material failure.

Poor: The paper base did not undergo material failure.

(Weight of Resin Component per Square Meter)

Each sheet of coated paper was cut into a 10 cm×10 cm piece, the weight of which was measured. The weight of the paper base was subtracted from the measured weight, and the calculated difference was multiplied by 100. The resulting value was adopted as the weight of resin component per square meter.

PRODUCTION EXAMPLES (Production Method of Resin Dispersion)

A resin dispersion containing P3HB3HH at a solids concentration of 50 wt % was obtained according to a method described in 2015/1461965.

(Production Method of Aqueous Coating Liquid)

A 2% aqueous solution of methyl cellulose (METOLOSE SM-400, manufactured by Shin-Etsu Chemical Co., Ltd.) was added to the resin dispersion such that the amount of the methyl cellulose was 1 part by weight per 100 parts by weight of the resin contained in the resin dispersion. The mixture was stirred to obtain an aqueous coating liquid.

Example 1

An aqueous dispersion containing P3HB3HH having a 3-hydroxyhexanoate unit content of 11 mol % and a weight-average molecular weight of $26 \times 10^4$ was used to produce an aqueous coating liquid. An A3-size paper base having a weight per square meter of 200 g/m$^2$ was coated with the aqueous coating liquid by means of a slit coater set to a coating thickness of 90 μm. The paper base coated with the aqueous coating liquid was heated in an oven at 160° C. for 3 minutes to form a coating layer. The weight of resin component per square meter was 20 g/m$^2$. The coated paper thus obtained was subjected to the peeling test.

Example 2

An aqueous dispersion containing P3HB3HH having a 3-hydroxyhexanoate unit content of 11 mol % and a weight-average molecular weight of $26 \times 10^4$ was blended with another aqueous dispersion containing P3HB3HH having a 3-hydroxyhexanoate unit content of 0.7 mol % and a weight-average molecular weight of $35 \times 10^4$ such that the proportion of the other dispersion was 10 wt % on the resin basis. The blend of the aqueous dispersions was used to produce an aqueous coating liquid. An A3-size paper base having a weight per square meter of 200 g/m$^2$ was coated with the aqueous coating liquid by means of a slit coater set to a coating thickness of 90 μm. The paper base coated with the aqueous coating liquid was heated in an oven at 160° C. for 3 minutes to form a coating layer. The weight of resin component per square meter was 20 g/m$^2$. The coated paper thus obtained was subjected to the peeling test.

Example 3

An aqueous dispersion containing P3HB3HH having a 3-hydroxyhexanoate unit content of 11 mol % and a weight-average molecular weight of $26 \times 10^4$ was blended with another aqueous dispersion containing P3HB3HH having a 3-hydroxyhexanoate unit content of 0.7 mol % and a weight-average molecular weight of $35 \times 10^4$ such that the proportion of the other dispersion was 5 wt % on the resin basis. The blend of the aqueous dispersions was used to produce an aqueous coating liquid. An A3-size paper base having a weight per square meter of 200 g/m$^2$ was coated with the aqueous coating liquid by means of a slit coater set to a coating thickness of 90 μm. The paper base coated with the aqueous coating liquid was heated in an oven at 160° C. for 3 minutes to form a coating layer. The weight of resin component per square meter was 20 g/m$^2$. The coated paper thus obtained was subjected to the peeling test.

Example 4

An aqueous dispersion containing P3HB3HH having a 3-hydroxyhexanoate unit content of 11 mol % and a weight-average molecular weight of $26 \times 10^4$ was blended with another aqueous dispersion containing P3HB3HH having a 3-hydroxyhexanoate unit content of 0.7 mol % and a weight-average molecular weight of $35 \times 10^4$ such that the proportion of the other dispersion was 20 wt % on the resin basis. The blend of the aqueous dispersions was used to produce an aqueous coating liquid. An A3-size paper base having a weight per square meter of 200 g/m$^2$ was coated with the aqueous coating liquid by means of a slit coater set to a coating thickness of 90 μm. The paper base coated with the aqueous coating liquid was heated in an oven at 160° C. for 3 minutes to form a coating layer. The weight of resin component per square meter was 20 g/m$^2$. The coated paper thus obtained was subjected to the peeling test.

Comparative Example 1

An aqueous dispersion containing P3HB3HH having a 3-hydroxyhexanoate unit content of 6 mol % and a weight-average molecular weight of $25 \times 10^4$ was used to obtain an aqueous coating liquid. An A3-size paper base having a weight per square meter of 200 g/m$^2$ was coated with the aqueous coating liquid by means of a slit coater set to a coating thickness of 90 μm. The paper base coated with the aqueous coating liquid was heated in an oven at 160° C. for 3 minutes to form a coating layer. The weight of resin component per square meter was 20 g/m$^2$. The coated paper thus obtained was subjected to the peeling test.

(Differential Scanning Calorimetry)

A PET film was coated with each of the aqueous coating liquids used in Examples 1 to 4 and Comparative Example 1 by means of a slit coater set to a coating thickness of 90 μm. The PET film coated with the aqueous coating liquid was heated at 160° C. for 3 minutes to form a coating layer. The coating layer was peeled from the PET film and subjected to differential scanning calorimetry described below.

An aluminum pan was charged with 2 to 5 mg of the coating layer, and the coating layer was subjected to differential scanning calorimetry which used a differential scanning calorimeter and in which the coating layer was melted under a stream of nitrogen by increasing the temperature from 20 to 190° C. at a rate of 10° C./min. Thus, a crystalline melting curve was obtained.

In the obtained crystalline melting curve, the temperature at which was located the top of a melting point peak appearing in the range of 100 to 150° C. was defined as the Tma, and the crystalline melting enthalpy of this peak was defined as the ΔHa. In the case where there were a plurality of melting point peaks in the range of 100 to 150° C., the melting point temperature of the highest of the melting point peaks was defined as the Tma, and the sum of the crystalline melting enthalpies of all of the melting point peaks was defined as the ΔHa.

The temperature at which was located the top of a melting point peak appearing in the range of 150 to 170° C. was defined as the Tmb, and the crystalline melting enthalpy of this peak was defined as the ΔHb. In the case where there were a plurality of melting point peaks in the range of 150 to 170° C., the melting point temperature of the highest of the melting point peaks was defined as the Tmb, and the sum of the crystalline melting enthalpies of all of the melting point peaks was defined as the ΔHb.

[Results]

FIG. 1 shows a crystalline melting curve obtained by differential scanning calorimetry for Example 1. For the coating layer of Example 1, the Tma was 120° C. and the Tmb was 154° C.

For the coating layer of Example 2, the Tma was 120° C. and the Tmb was 152° C.

For the coating layer of Example 3, the Tma was 120° C. and the Tmb was 165° C.

For the coating layer of Example 4, the Tma was 120° C. and the Tmb was 165° C.

For the coating layer of Comparative Example 1, the Tma was 145° C., but there was no melting point peak in the range of 150 to 170° C.

Table 1 shows the results of the peeling test conducted two seconds after heat sealing for pressure-bonding of different portions of the coating layer in Examples 1 and 2 and Comparative Example 1, and further shows the values of Tma, Tmb, and ΔHb/ΔHa. Table 2 shows the results of the peeling test conducted two seconds after heat sealing for pressure-bonding of the coating layer and the paper base in Examples 1 to 4 and Comparative Example 1, and further shows the values of Tma, Tmb, and ΔHb/ΔHa.

In Comparative Example 1, in the cases where different portions of the coating layer were pressure-bonded (Table 1) and the peeling test was conducted two seconds after the heat sealing, the paper base underwent material failure when the heating temperature during the heat sealing was in the range of 140 to 160° C. In the cases where the coating layer and the paper base were pressure-bonded (Table 2), the paper base underwent material failure when the heating temperature during the heat sealing was 180° C. Material failure of the paper base did not occur when the heating temperature during the heat sealing was other than 140° C., 160° C., and 180° C., and this means that the molten resin failed to fully solidify at the other temperatures.

For the coating layers of Examples 2 to 4, the values of Tma and Tmb are not significantly different from those in Example 1, but the value of ΔHb/ΔHa was from 0.25 to 0.51 and greater than the value of 0.12 in Example 1. In the peeling test conducted two seconds after the heat sealing, material failure of the paper base occurred even when the heating temperature during the heat sealing was 220° C. (Table 1) or 190° C. (Table 2). This means that the resin quickly solidified immediately after the heat sealing to exhibit satisfactory bond strength at higher temperatures than in Example 1.

TABLE 1

| | HH content in PHBH (mol %) | Tma (° C.) | Tmb (° C.) | ΔHb/ΔHa | Results of peeling test conducted two seconds after heat sealing of different portions of coating layer Heat sealing temperature (° C.) | | | | | | |
|---|---|---|---|---|---|---|---|---|---|---|---|
| | | | | | 120 | 140 | 160 | 170 | 180 | 200 | 220 |
| Example 1 | 11 | 120 | 154 | 0.12 | Good | Good | Good | Good | Good | Average | Poor |
| Example 2 | Blend of 11 and 0.7 (Average: 10) | 120 | 153 | 0.33 | Good | Good | Good | Good | Good | Average | Average |
| Comp. Example 1 | 5 | 145 | — | 0 | Poor | Average | Average | Poor | Poor | Poor | Poor |

TABLE 2

| | HH content in PHBH (mol %) | Tma (° C.) | Tmb (° C.) | ΔHb/ΔHa | Results of peeling test conducted two seconds after heat sealing of coating layer and paper base Heat sealing temperature (° C.) | | | | |
|---|---|---|---|---|---|---|---|---|---|
| | | | | | 140 | 160 | 170 | 180 | 190 |
| Example 1 | 11 | 120 | 154 | 0.12 | Good | Good | Good | Average | Poor |
| Example 2 | Blend of 11 and 0.7 (Average: 10) | 120 | 152 | 0.33 | Good | Good | Good | Good | Average |
| Example 3 | Blend of 11 and 0.7 (Average: 10.5) | 120 | 165 | 0.25 | Good | Good | Good | Average | Average |
| Example 4 | Blend of 11 and 0.7 (Average: 8.9) | 120 | 165 | 0.51 | Good | Average | Average | Average | Average |
| Come. Example 1 | 6 | 145 | — | 0 | Poor | Poor | Poor | Average | Poor |

In Example 1, in the cases where different portions of the coating layer were pressure-bonded (Table 1) and the peeling test was conducted two seconds after the heat sealing, the paper base underwent material failure when the heating temperature during the heat sealing was in the wide range of 120 to 200° C. In the cases where the coating layer and the paper base were pressure-bonded (Table 2), the paper base underwent material failure when the heating temperature during the heat sealing was in the wide range of 140 to 180° C. These results indicate that in the above temperature ranges, the molten resin became solidified to exhibit satisfactory bond strength in two seconds after the heat sealing.

The above results are summarized as follows. In Example 1, satisfactory bond strength was exhibited in a short time at a low heat sealing temperature at which satisfactory bond strength was not exhibited in Comparative Example 1. In Examples 2 to 4, satisfactory bond strength was exhibited in a short time at higher temperatures than in Example 1. A possible reason for this effect is that in coating layers such as those of Examples 1 to 4 which have not only a melting point peak in the range of 100 to 150° C. but also a melting point in the range of 150 to 170° C., the resin crystal to which the melting point peak in the range of 150 to 170° C. is attributed acts as a nucleus to accelerate the solidification of the molten resin. The extent to which the solidification speed is increased is considered proportional to the value of ΔHb/ΔHa.

In Example 4, where P3HB3HH having a 3-hydroxyhexanoate unit content of 0.7 mol % was added in an amount of 20 wt %, the area of the peeled portion of the paper base was reduced although the solidification performance was enhanced. This is presumably because the resin had an increased melt tension, which caused the resin to seep into the paper base less readily. Thus, in terms of ensuring the strength of the laminated article, it is desirable to adjust the amount of P3HB3HH having a 3HH unit content of less than 8 mol % or the amount of P3HB.

The invention claimed is:

1. A laminated article comprising:
   a base layer; and
   a coating layer disposed over at least one side of the base layer,
   wherein
   the base layer is a layer of paper,
   the coating layer comprises a poly(3-hydroxybutyrate) resin,
   in a crystalline melting curve obtained by differential scanning calorimetry of the coating layer, the coating layer has at least one peak top temperature (Tma) in a range of from 100 to 150° C. and at least one peak top temperature (Tmb) in a range of from 150 to 170° C.,
   a difference between the temperatures Tma and Tmb is at least 10° C.,
   the poly(3-hydroxybutyrate) resin comprises poly(3-hydroxybutyrate-co-3-hydroxyhexanoate) having a content of 3-hydroxyhexanoate unit of from 8 to 25 mol %, and poly(3-hydroxybutyrate-co-3-hydroxyhexanoate) having a content of 3-hydroxyhexanoate unit of from 0.1 to 1 mol %, and
   an amount of the poly(3-hydroxybutyrate-co-3-hydroxyhexanoate) having the content of 3-hydroxyhexanoate unit of from 0.1 to 1 mol % is from 5 to 15 wt % of a total amount of the poly(3-hydroxybutyrate) resin contained in the coating layer.

2. The laminated article according to claim 1, wherein in the crystalline melting curve obtained by the differential scanning calorimetry of the coating layer, a ratio (ΔHb/ΔHa) of a crystalline melting enthalpy (ΔHb) of the peak in the range of from 150 to 170° C. to a crystalline melting enthalpy (ΔHa) of the peak in the range of from 100 to 150° C. is from 0.01 to 2.

3. The laminated article according to claim 2, wherein the ratio ΔHb/ΔHa is from 0.05 to 1.

4. The laminated article according to claim 2, wherein the ratio ΔHb/ΔHa is from 0.1 to 0.8.

5. The laminated article according to claim 2, wherein the ratio ΔHb/ΔHa is from 0.2 to 0.4.

6. The laminated article according to claim 1, wherein the poly(3-hydroxybutyrate) resin has a weight-average molecular weight of from $5\times10^4$ to $65\times10^4$.

7. The laminated article according to claim 6, wherein the poly(3-hydroxybutyrate) resin has a weight-average molecular weight of from $15\times10^4$ to $50\times10^4$.

8. The laminated article according to claim 1, further comprising an intermediate layer between the base layer and the coating layer.

9. The laminated article according to claim 1, wherein the difference between the temperatures Tma and Tmb is at least 20° C.

10. The laminated article according to claim 1, wherein the difference between the temperatures Tma and Tmb is from 10° C. to 60° C.

11. The laminated article according to claim 1, wherein the difference between the temperatures Tma and Tmb is from 20° C. to 50° C.

12. The laminated article according to claim 1, wherein an amount of a resin other than the poly(3-hydroxybutyrate) resin in the coating layer is from 0 to 10 parts by weight per 100 parts by weight of the poly(3-hydroxybutyrate) resin.

13. The laminated article according to claim 1, wherein the poly(3-hydroxybutyrate-co-3-hydroxyhexanoate) having the content of 3-hydroxyhexanoate unit of from 8 to 25 mol % has a content of 3-hydroxyhexanoate unit of from 10 to 18 mol %.

14. A molded article comprising the laminated article according to claim 1.

15. A method for producing the molded article according to claim 14, the method comprising heat-sealing the coating layer.

16. A method for producing the laminated article according to claim 1, the method comprising:
   applying an aqueous coating liquid comprising the poly(3-hydroxybutyrate) resin to a base to form a film of the aqueous coating liquid; and
   heating the film at a temperature of from 130 to 170° C. to form the coating layer.

* * * * *